Figure 7:
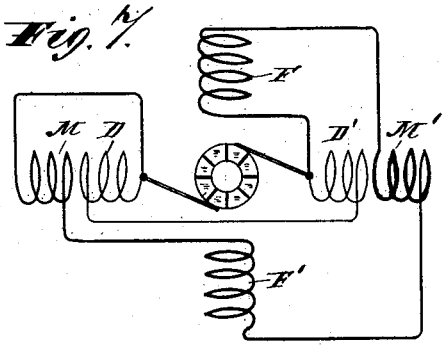

(No Model.) 4 Sheets—Sheet 1.
E. THOMSON.
DYNAMO ELECTRIC MACHINE OR MOTOR.
No. 376,120. Patented Jan. 10, 1888.
Fig. 1.
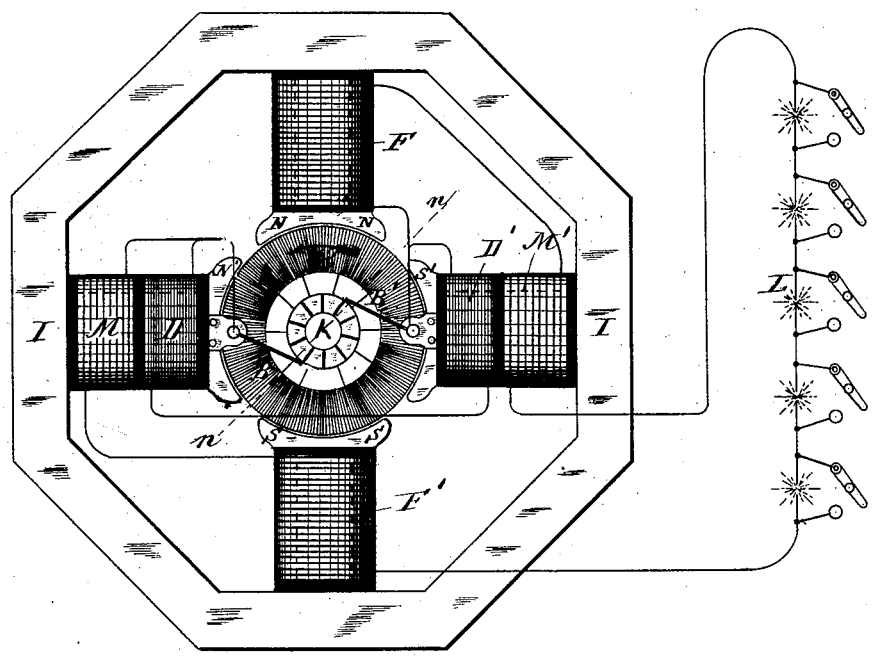
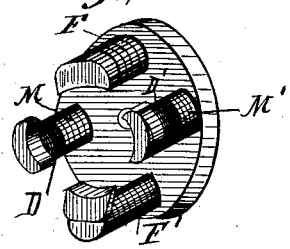
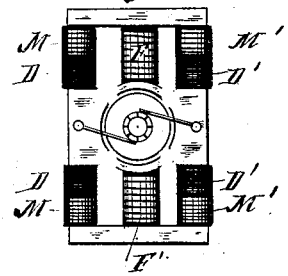
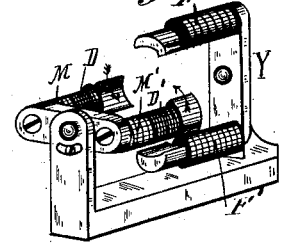
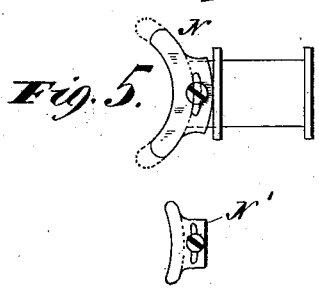
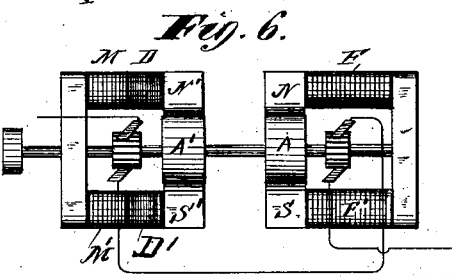
WITNESSES:
Gabriel J. W. Galster.
Wm. H. Capel.
INVENTOR
Elihu Thomson.
BY
Townsend & MacArthur
ATTORNEYS
N. PETERS, Photo-Lithographer, Washington, D. C.

(No Model.) 4 Sheets—Sheet 2.

E. THOMSON.
DYNAMO ELECTRIC MACHINE OR MOTOR.

No. 376,120. Patented Jan. 10, 1888.

WITNESSES:
Gabriel J. W. Galster.
Wm. H. Capel.

INVENTOR
Elihu Thomson.
BY
Townsend MacArthur
ATTORNEYS (No Model.) 4 Sheets—Sheet 3.
E. THOMSON.
DYNAMO ELECTRIC MACHINE OR MOTOR.

No. 376,120. Patented Jan. 10, 1888.

WITNESSES:

INVENTOR
Elihu Thomson
BY
Townsend & MacArthur
ATTORNEYS (No Model.) 4 Sheets—Sheet 4.
E. THOMSON.
DYNAMO ELECTRIC MACHINE OR MOTOR.
No. 376,120. Patented Jan. 10, 1888.
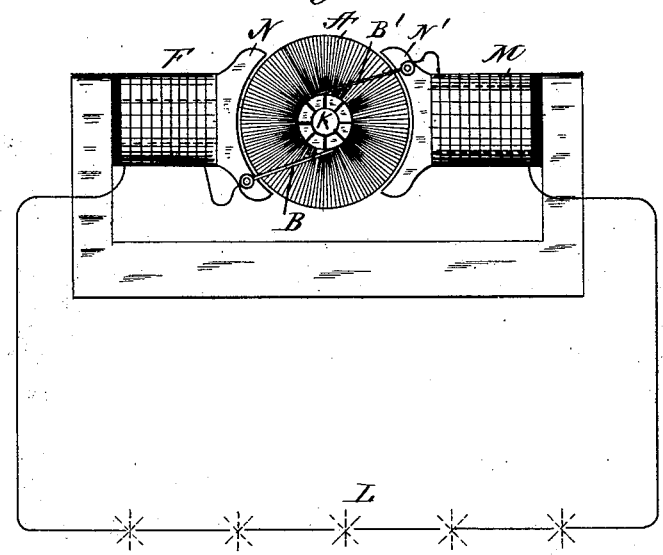
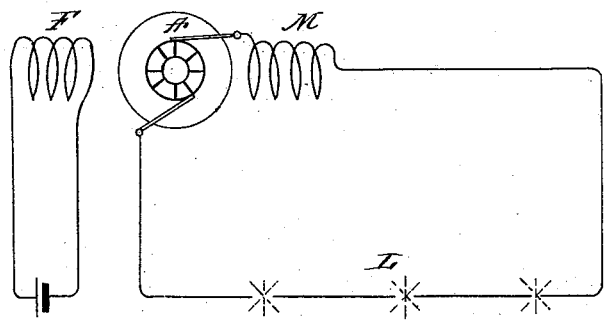
WITNESSES:
INVENTOR
Elihu Thomson
BY
ATTORNEYS

UNITED STATES PATENT OFFICE.

ELIHU THOMSON, OF LYNN, MASSACHUSETTS.

DYNAMO-ELECTRIC MACHINE OR MOTOR.

SPECIFICATION forming part of Letters Patent No. 376,120, dated January 10, 1888.

Application filed March 30, 1887. Serial No. 232,942. (No model.)

*To all whom it may concern:*

Be it known that I, ELIHU THOMSON, a citizen of the United States, and a resident of Lynn, in the county of Essex and State of Massachusetts, have invented a certain new and useful Dynamo-Electric Machine or Motor, of which the following is a specification.

The object of my invention is to provide a simple and effective means whereby dynamo-electric machines and motors may be made self-regulating, so as to have a generating capacity or efficiency or a motor-power capacity or efficiency automatically adapted to variations in the work demanded of the machine or in the current supplying the machine when the same is used as a motor.

My invention is designed more especially for application to dynamo-machines used as generators for supplying current to a series circuit where a decrease of the resistance demands a decrease in the electro-motive force of the machine in order that there may not be a great change in the volume of current on the circuit, but is likewise applicable to electric motors.

The object of my invention is more especially to so construct the machine as to avoid the employment of any regulating devices outside of the machine itself, the regulation of the capacity or efficiency of the machine being effected by the changes in the distribution of current on the coils of the same, due to changes in external conditions on the circuit which the machine supplies or to changes in the current in the machine when used as a motor.

I shall hereinafter describe my invention as applied to a dynamo electric machine and will set forth the arrangements of field-magnet coils which shall make the same capable of operating arc lights or other resistances in series in such way that any or all of the resistances or arc lights may be shunted without causing much change in the volume of current on the line.

The manner of employing my invention in a dynamo-machine used as a motor will be obvious to electricians from a description of the invention as applied to a machine used as a generator.

My invention consists in the combination, with a field-magnet coil which is wound to produce saturation or approximate saturation in its core, of a second set of coils properly wound and applied to have a variable effect on the field magnetism of the machine in accordance with the variations in the amount of the work. This second set of coils may act upon the field magnetism in any desired way, and is preferably wound as a coil which shall serve to set up magnetism of a polarity that would tend, when the work is diminished, to develop a counter electro-motive force to that developed by coils which are acted upon by the pole of the saturated core. The second set of coils may be applied to a core or pole which acts on the armature independently of the pole of the saturated core, or it may be applied to a core or a field which is inductively magnetized from the saturated pole, as will be hereinafter described.

The saturated or highly-magnetized core may be maintained by a coil supplied with current from any source, but preferably from the armature of the machine itself. The coil whose effect is variable with the work may be connected either as a derived circuit coil or as a main-circuit coil.

When the machine is used as a constant-current machine, the second coils or set of coils may be in the main circuit, though, as will be presently described, they might be in the derived circuit and compounded with a main-circuit coil. When in the derived circuit, it would normally tend to set up magnetism which would assist that of the saturated core in developing current, and its effect would decrease with a decrease in the external resistance. If it be a main-circuit coil, it is applied so as to tend to set up a magnetism which, if permitted to be developed, will produce upon armature-coils in the circuit a current of a polarity opposing that developed at the same time in armature-coils or portions of coils exposed to the magnetic field developed by the saturated core.

In the present application I have described the coils having a variable magnetic effect as acting on a core whose pole is not inductively acted upon by the pole of the saturated core; but in another application filed of even date herewith I have made specific claims to that form of my invention wherein the saturated core sets up by induction magnetism in another pole or in a magnetic field to which is applied the opposing coil, whose effect increases when the demand upon the machine decreases. In the former case the pole of the saturated core and the pole of the core acted upon by a variable coil form in effect a compound pole, as will more particularly hereinafter appear.

Figure 8:
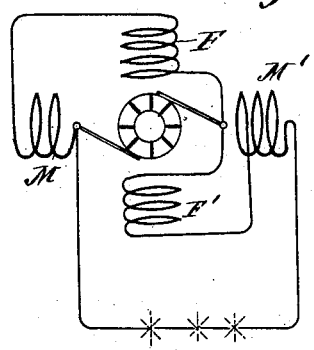
Figure 9:
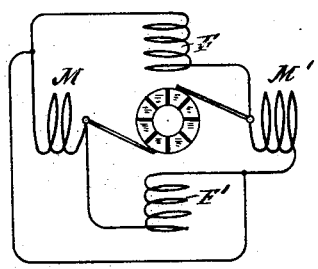
Figure 10:
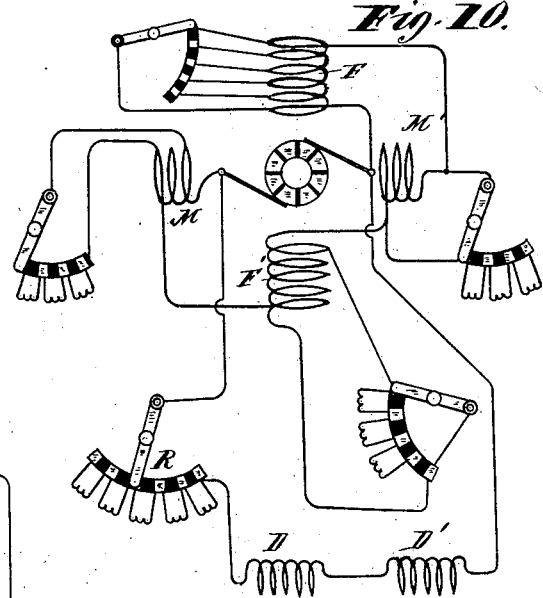
Figure 11:
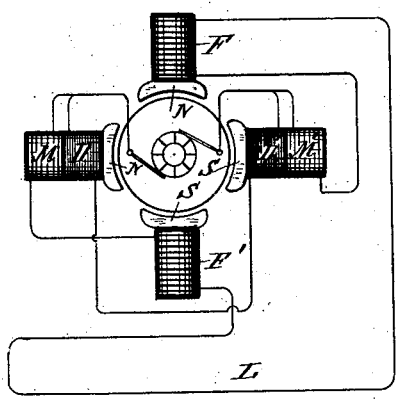
Figures 12, 13:
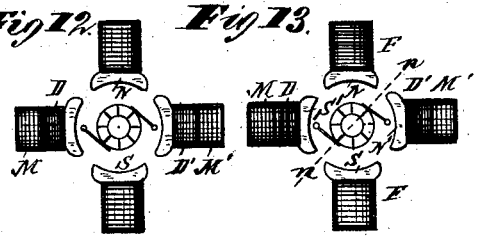
Figure 14:
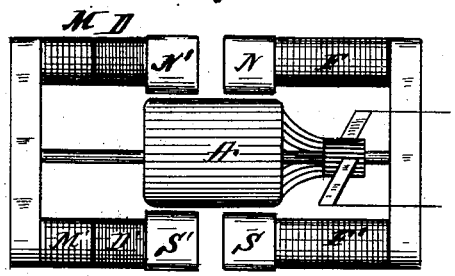
Figure 15:
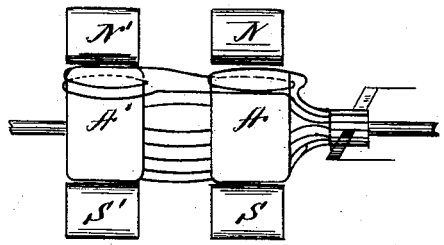
Figure 16:
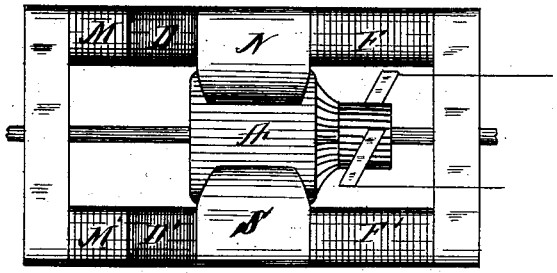
Figure 17:
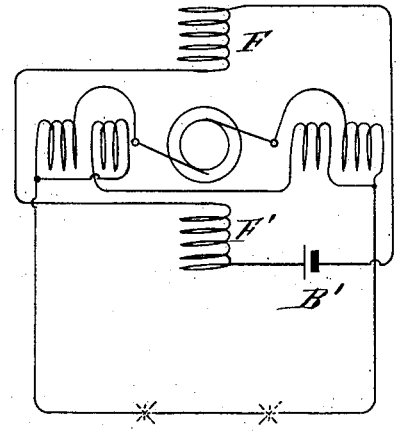

In the accompanying drawings, Figure 1 is a side elevation of a machine embodying that form of my invention wherein cores permanently magnetized or magnetically saturated are employed conjointly with other cores magnetized differentially by coils in a high-resistance derived circuit and a coil in the main circuit or a part thereof. Figs. 2, 3, and 4 illustrate modified forms of field-magnet in which my invention is embodied. Fig. 5 is a detail of construction of a field-magnet pole especially adapted to my invention. Fig. 6 illustrates a modification of my invention in which the saturated core and the non-saturated or variable core act on separate armatures connected into the same circuit. Figs. 7, 8, and 9 are diagrams illustrating various ways of connecting the field-coils of the machine to one another and to the armature. Fig. 10 is a diagram illustrating an arrangement of circuits and devices that may be conveniently employed in determining the proper proportion of the various coils. Figs. 11, 12, and 13 are diagrams illustrating the magnetic actions. Figs. 14, 15, and 16 show other embodiments of my invention. Fig. 17 illustrates a modification in which the saturated cores are magnetically maintained from a separate source. Figs. 18 and 19 show forms of the invention in which the field magnetism is normally maintained entirely by the action of the saturated core.

Referring to Fig. 1, A indicates the armature of the machine, which may be wound after the Gramme or Siemens style, or in any other desired way, the iron core of said armature being practically continuous.

K indicates a commutator for such an armature, and B B' the commutator-brushes. If the armature is Gramme or Siemens wound, it is best to employ a considerable number of sections.

I indicates a field-magnet frame, which, if desired, is of magnetic material, and to which the various field-magnet cores may be conveniently attached.

The cores of the electro-magnets F F', attached thereto, are of moderate diameter, and are magnetized to saturation when the normal current passes in their coils. The purpose of this is to secure a practically unchanging or constant magnetism in the poles N S of said electro-magnets, which act on the armature under a normal current. This is especially desirable when arc lights are to be run in series from the machine. When, however, the working-resistances on the general circuit are of such character that they are fairly uniform—that is to say, are not subject to variations in themselves, as arc lights are, owing to decrease of arc resistance on increase of current—the magnetism of F F' may be somewhat below saturation.

The coils on the electro-magnets F F' are properly wound to cause poles of opposite magnetism to exist in the pole-pieces N S, as indicated.

N' S' indicate other pole-pieces acting on the same armature, A, or, as will be hereinafter described, upon coils of another armature in the same circuit with A, which pole-pieces are attached to cores wound with coils D D'. The latter in the present form of my invention are in a shunt or derived circuit around the main circuit, containing lamps L. They may be connected, as shown, directly from brush to brush of the machine, so as to be a shunt not only to any field coils in the circuit with the brushes, but also to the external circuit, or they may be connected in a shunt which shall be a shunt to the external circuit only—that is to say, they may be either on "long shunt" or "short shunt."

The coils D D' are of such high resistance as to permit only a small fraction of the current to pass, and, as will be obvious, the amount of current passing will depend upon the resistance of the circuit external to the armature. If the external circuit, containing lights L in series, be low, as it would be if few lights were burning, less current would flow in the coils D D', and they would have less energizing power in developing magnetism in the poles N' S'.

The coils D D' are properly applied to produce in the pole S', which is on the same side of the line of commutation n n with the pole S, a pole of the same polarity, while in the same manner the pole N', which is on the same side of said line with pole N, is of the opposite or north polarity—that is to say, of the same polarity as that of the pole N. The brushes B B' are set on the line of commutation n n, which lies, as shown, between the pole of the constantly-magnetized core and the pole of the variable core. A strong double north will, with this construction, exist on one side of line n n and a similar south magnetism on the other side of said line when the number of lights at L is such as to cause considerable current to be diverted into the coils D D'. The poles S S' form together a compound pole-piece, and the poles N N' together another compound pole-piece.

The machine as thus constructed would regulate for variations in the number of lights on the circuit L, or for other variations of resistance thereon through the changes in the strength of magnetism in the poles S' N'. The regulation effected by such an arrangement is not, however, so perfect as it may be made by the application of main circuit coils M M', which shall carry the main generated current fed to the lights, and which are properly applied so as to tend to set up a magnetism opposite to that developed by the coils D D', so that they will constantly tend to cut down the magnetism in N' S', or even to reverse it.

The resultant effect is obviously determined by the relative energy of the two sets of windings D D' M M'. The proportions are made such that with half-load at L, or even less, the energizing effects of the two coils shall be nearly balanced, so that weak magnetism, or even no magnetism at all, shall exist in the poles N' S', while if the resistance on the circuit L decrease abnormally, or if, for instance, all the lamps be short-circuited, the magnetism of N' and S', respectively, shall be reversed, owing to the coils D D' losing nearly all their power and the coils M M' carrying approximately all the current that flows to the external circuit. Under such conditions the pole S' will become north and the pole N' would become south. There would therefore exist on one side of the line $n$ $n$ a strong north at N and a weaker south and on the other a strong south at S and a weaker north. This condition results in almost killing the activity of the apparatus, and if the proportions between the magnetizing influences of the coils are properly selected the machine will maintain its normal current on closed circuit, and also with any number of lamps or other devices in circuit up to the maximum which the machine is adapted to operate.

The proportion of the magnetic influences depends not only on the relative magnetizing strength of the coils, but upon the relative extent of pole-face presented to the armature and the distances of such pole-faces from the armature, also upon the construction of the armature itself in respect to the number of turns of wire, the amount of iron in its core, &c., so that it is impossible to specify absolute conditions or proportions. Moreover, the kind or quantity or quality of the iron in the field-magnets will influence the result.

The relative energizing powers which should be given to any or all of the coils may sometimes be conveniently determined originally by the arrangements of devices illustrated in Fig. 10, where each of the various coils described is shown provided with means for adjusting its energizing power. The coil F in that figure is illustrated as having a variable number of sections which may be thrown into or out of circuit by a switch of usual construction, while F' has a variable resistance and switch in a shunt around it. Coils M M' are similarly provided with variable resistance-shunts, while the coils D D' have a variable resistance included in circuit with them, whereby their energizing power may be governed when needed.

It is quite apparent that by suitable arrangements the effects of both coils M M' or of F F' might be adjusted together, or, if it be found that their windings are correctly proportioned and it is desired to vary their action as a whole, a variable shunt might be placed around them all together. These are obvious variations which need not be further specifically described.

By winding the various coils ordinarily so that they shall be of somewhat excessive power and then cutting them down to the proper degree, experimentally, by the use of the adjusting device described, the various proportions necessary to the particular conformation of field-magnet, extent of pole-faces, quality of iron, and other variable conditions may be determined, so that a correct winding may be deduced by simple calculations and then reproduced in other machines of the same kind.

In the form of field-magnet shown in Fig. 2 the various electro-magnets are mounted parallel to one another on a common supporting disk or plate. In another form which may be employed and which is shown in Fig. 3, the electro-magnets F F' are between sets of differential coils D D' M M'. In this instance the latter coils are divided into two sets and disposed so as to produce a consequent pole at a point between the divisions.

It is obvious that the differential coils D' M' or D M may be relatively disposed on their cores in any of the ways ordinarily employed in the art—that is to say, wound in alternate sections or layers, or one entirely over the other, or in any other desired relative disposition.

In Fig. 4 the magnets F F' are shown as carried by one yoke, Y, fixed to a suitable base, and the magnets carrying the coils D M and D' M' are connected to a separate yoke properly mounted, as indicated, so as to permit the poles of the latter electro-magnet to be adjusted with relation to the poles of F F' at will. This construction is sometimes useful in determining the proper action of the armature and commutator. It is sometimes desirable, also, to make the pole-faces themselves movable, as indicated at N in Fig. 5. By this means the pole may be set at different positions around the armature without changing the position of the core.

If the pole-face be made detachable, as indicated, an additional and useful means of determining and varying the relative action of the pole-pieces is provided, since the pole-face may be removed and another one of a different size substituted therefor. By making the pole-faces adjustable and detachable, as described, a compensation for a want of balance or proper proportion of the sets of coils is secured.

In the forms of the inventions thus far described the poles of the saturated field-magnet and the variable field-magnet pole act upon coils wound upon the same armature. It is apparent, however, that, as the parts of the coil which are at the same time acted upon are in the same circuit, such coils might be the coils of separate armatures, as indicated in Fig. 6, where the two armatures A A' are connected in series, and one of them, A, is affected solely by the constant poles N S, while the other is subjected to the variable effect of the poles N' S', which may decrease in power in developing current to assist armature A, or may even be reversed in polarity, so as to set up in A' a counter electro-motive force to that developed in A. The brushes on the commutators would in this case, however, generally require adjustment during variations of load, while with the construction shown in Fig. 1, and with any ordinary form of armature—such as, for instance, is found in typical Gramme machines—the brushes may be kept in one position.

Fig. 7 is a diagram of the connections of the coils shown in Fig. 1, F F' and M M' being in series. They might be connected in multiple arc, as when wound with wire of half of the section of that used in the former case. This is indicated in Fig. 8.

Fig. 9 indicates another multiple arc arrangement. Other arrangements can be made by selecting proper sizes of wire. All that is necessary is that the current shall act to energize the coils F F' M M', so as to give the properties described to the magnets. In the same way coils D D' may be used in series or in multiple arc, according to their winding. The various coils may derive their current from any source, but preferably from the machine itself.

Fig. 11 shows the magnetic polarities that are developed when all the lights L are in use and the machine is working at maximum power. The high electro-motive force gives to coils D D' in shunt so much power that they overcome the coils M M' and develop strong poles, as indicated, which assist the poles of F F' in acting on the armature to keep up the potential. When lights are cut out, the force of the current in D D' diminishes on account of the lessened potential around those that remain, and the condition indicated in Fig. 12 may be produced, in which poles N S alone act, because the coils D D' respectively neutralize the effects of the coils M M'. Further shunting or cutting off of lights will give rise to the condition indicated in Fig. 13, where the coils M M', respectively, have overcome the effects of the coils D D' and have developed poles of the sign indicated at N' S'. The result is the development in the portions of armature-coil exposed to said poles of a counter electro-motive force that opposes the current developed in the armature-windings acted upon by the poles N S. This counter electro-motive force may reach such an amount that the machine on closed circuit will develop a current of sufficient potential only to give the normal current over its own internal resistance.

The two sets of poles may be placed in the same line parallel to the axis of the armature, as indicated in Fig. 14; or, as indicated in Fig. 15, a double armature may be used, the coils of which respectively are connected in series between the pairs of plates of a single commutator. The electro-motive force of the coils on each of the two armatures A A' will be combined when N N' and S S' are respectively of the same polarity, and will be opposed or differentiated when the poles N' S' are reversed.

The saturated core and the core for the coil of variable effect may sometimes act on the same pole-piece, as indicated in Fig. 16. The actions of the respective windings are the same as in Figs. 14 and 15, except that the energizing power of D and D' must be sufficient when the load is all on not only to overcome the tendency of coils M M' to reverse the core polarity of D D', but also that of the cores of F F' to do the same, so as to short-circuit the magnetism of the field through the cores of magnets D M' D' M and their connecting-yoke.

In fact, the construction indicated does not really require the use of coils M M' at all, as the reversing tendency acting against the normal tendency of coils D D' may be obtained from coils F F', which, when of great power, may even require that coils M M' be wound or connected, so as to assist D D' in maintaining poles at N S.

The special structure shown in Fig. 16, while it embodies the saturated core, is not specifically claimed herein, but reserved for a separate application.

As before stated, the various coils may derive their current from any desired source, and, as indicated in Fig. 17, coils F F' may be energized by current from a separate battery, B', or other suitable generator, since their function is simply to maintain under all conditions suitable poles at N and S. The magnets F F' might obviously, therefore, be simply permanent magnets.

In those forms of my invention hereinbefore described the variable magnetic effect on the field of the machine is described as produced either by a variable circuit-coil alone or by a main and derived circuit coil acting differentially, the magnetism being maintained normally by the superior effect of the derived-circuit coil. In most of the forms, also, the variable-action coils are applied to developing polarity in a pole-piece independent of that which is produced by the saturating coils F F'. The opposing coil or coils M M' may be, however, used alone without being combined with the derived-circuit coils D D', and may act upon a pole-piece which is inductively magnetized from the pole of the saturated core. In such case the opposing coils have, as before, a comparatively weak effect, and the pole in which the magnetism is induced is normally active in developing current in the armature of proper polarity to assist that developed by the direct action of the saturated core.

The modification last described is illustrated in Figs. 18 and 19.

The coil F is wound on a field-core of moderate section and energizes the same to saturation when the normal current flows. Many convolutions of wire in F are required.

The coil M' is wound upon a core whose pole-piece N', being opposite N, is magnetized by induction from the latter through the armature, which induction is so strong as to overcome the magnetizing tendency of coil M, tending to set up an opposite polarity in said pole-piece N. The coil M is either coarser than coil F or at least has fewer turns—say one-fifth as many as F; but its core is of large body and is far below saturation. The coil M tends to make a pole at the pole-face N' of the same name as that at N; but the strong induction from N overcomes this tendency and forces N' to assume an opposite polarity.

The coils F and M may be both in the same circuit with the lights and the armature, or may derive current from any other suitable source.

The magnetizing effect of current in coil F is limited to saturating its core, while the opposing effect of the current in the coil M will obviously tend to increase with any tendency to increase of current on the circuit by virtue of the non-saturation of its core. The result is that, with the arrangement shown, the coil M tends to keep the current down to normal, although the resistance on the circuit may vary.

It is obvious that the variations of current in M due to increase of external resistance might be produced by any arrangement of circuits or devices without departing from the invention.

The coil F might derive its current from an independent source, as indicated in Fig. 19.

In most of the forms of my invention hereinbefore described it will be observed that the normal field magnetism is maintained in part by the action of the saturated core and in part by a separate coil and core whose effect is variable.

That particular form of my invention in which the field magnetism is maintained solely by the action of the coil on the saturated core is claimed in a separate application filed of even date herewith.

It will be understood by those skilled in the art that, although I have described the coils D D', Fig. 1, as connected in shunt to the work L, any other equivalent connection or construction feeding current to said coils with an electro-motive force or an energizing effect in proportion to the work at L will serve the purposes of my invention, and I do not limit myself to the precise constructions shown.

What I claim as my invention is—

1. In a dynamo-electric machine or motor, a compound pole-piece one portion of which is of constant or approximately constant effect upon the armature, while the other varies with the load, as and for the purpose described.

2. The combination, with armature-coils in the same circuit, of two field-magnet pole-pieces, one of which is of approximately constant strength, while the other is variable with the load, as and for the purpose described.

3. In a dynamo-electric machine or motor, a field-magnet pole-piece constantly magnetized to saturation, or approximately saturation, in combination with a field-pole acting on the same armature or armature-coils in the same circuit and wound with coils which are connected to the circuit of the machine and whose magnetizing effect on their field-pole is variable.

4. In a dynamo-electric machine or motor, a field-pole constantly magnetized to saturation, or approximately saturation, in combination with a field-pole of variable magnetism excited by a coil in derived circuit to the work.

5. In a dynamo-electric machine or motor, the combination, with the armature, of two pole-pieces of the same polarity, one having a constant or approximately constant effect upon the armature and the other provided with a main-circuit coil wound to normally oppose or cut down the magnetism of the same, as and for the purpose described.

6. In a dynamo-electric machine or motor, the combination, with the armature, of two field-magnet cores, one provided with an exciting derived-circuit coil whose influence is opposed by a main-circuit coil tending to cut down the magnetism and the other a pole-piece whose magnetic influence upon the armature is approximately constant.

7. In a dynamo-electric machine or motor, a field-magnet pole having a magnetic saturation or approximate magnetic saturation, in combination with a second pole-piece variable in strength according to the work.

8. In a dynamo-electric machine or motor, a field-magnet pole having a magnetic saturation, in combination with a second pole whose normal magnetism is opposed by a main-circuit coil, as and for the purpose described.

9. In a dynamo-electric machine or motor, a field-magnet pole normally saturated by the current of the machine, in combination with a second pole whose magnetism is normally maintained by a derived-circuit coil and with a direct-circuit coil for cutting down or reversing the magnetism of said derived-circuit coil, as and for the purpose described.

10. The combination, in a dynamo-electric machine or motor, of a field-magnet core magnetized nearly or quite to saturation and a field-magnet core whose strength decreases with a decrease in the work.

11. The combination, in a dynamo-electric machine or motor, of a field-magnet core magnetized nearly or quite to saturation and a field-magnet core having a demagnetizing-coil in the main circuit, as and for the purpose described.

12. In a dynamo-electric machine or motor, the combination of a field-magnet core magnetized nearly or quite to saturation, a field-magnet core excited by a derived-circuit coil, and a main-circuit coil acting in opposition to the latter.

13. In a dynamo-electric machine or motor, a field-magnet core excited nearly or quite to saturation, by current in the coil connected to the circuit of the machine, in combination with a magnet-core having a pole-piece separate from that of the first core and wound with a derived-circuit coil, as and for the purpose described.

14. In a dynamo-electric machine or motor, the combination of the three coils, one of which excites its core to saturation, while the other two are respectively in a derived circuit and a main circuit and act differentially upon a core, as and for the purpose described.

15. The combination, with a field-magnet coil which is wound to produce saturation or approximate saturation in a dynamo-electric machine or motor, of a magnetic coil wound in proper manner to set up magnetism which would develop an armature-current counter to that developed by the first-named coil.

16. In a dynamo-electric machine having a field-magnet core normally and constantly saturated or approximately saturated, as described, a coil applied to another portion of the field-magnet or magnetic field and wound to oppose or cut down such field magnetism, as and for the purpose described.

17. In a constant current or series dynamo, the combination of field-magnet cores magnetized to a high degree of saturation and field-magnet coils differentially magnetized, as and for the purpose described.

18. In a dynamo-electric machine for supplying a constant current, the combination, with field-magnet cores magnetized nearly to saturation, of field-magnet coils differentially magnetized by a shunt-circuit to the work opposed by a coil in the main circuit.

19. In a dynamo-electric machine, field-poles or pole-pieces adjustable around the circumference of the armature independently of the field-magnet, whereby they may be set at different circumferential positions, as and for the purpose described.

20. In a dynamo-electric machine or motor, the combination, with a field-magnet having two sets of pole-pieces, one of constant and the other of variable polarity, of an armature whose line of commutation is on a line passing between the constant and variable poles, as and for the purpose described.

21. In a dynamo-electric machine, the combination, with an armature, of four field-magnet poles, each two of which on the same side of the line of commutation are respectively of constant strength and of variable strength, according to the work demanded of the machine.

22. In a dynamo-electric machine or motor, the combination, with the armature, of four field-magnet poles, each pair of which on the same side of the line of commutation consists, respectively, of a pole-piece whose magnetism is constant or approximately constant and a pole-piece which is normally of the same polarity with the first, but is provided with a counteracting coil which serves to reverse the polarity of the same, as and for the purpose described.

23. The combination, with a dynamo-electric machine or motor, of a set of interchangeable pole-pieces of different magnetic effect, as and for the purpose described.

Signed at Lynn, in the county of Essex and State of Massachusetts, this 24th day of March, A. D. 1887.

ELIHU THOMSON.

Witnesses:
E. WILBUR RICE, Jr.,
J. W. GIBBONEY.